United States Patent [19]
Primus et al.

[11] 3,749,056
[45] July 31, 1973

[54] DEVICE FOR LINING PIPES WITH CALCITE

[75] Inventors: Norman S. Primus, East Orange, N.J.; Raymond Hunhoff, Oak Lawn, Ill.

[73] Assignee: National Water Main Cleaning Co., Chicago, Ill.

[22] Filed: May 24, 1971

[21] Appl. No.: 146,490

Related U.S. Application Data
[60] Division of Ser. No. 820,101, Apr. 29, 1969

[52] U.S. Cl. .................. 118/408, 117/95, 118/254, 118/602
[51] Int. Cl. ............................................. B05c 7/08
[58] Field of Search .................. 118/408, 602, 254, 118/7; 137/604, 606, 563; 117/95, 97, 102, DIG. 3

[56] References Cited
UNITED STATES PATENTS

| | | | |
|---|---|---|---|
| 2,065,583 | 12/1936 | Heitzmann | 210/28 |
| 2,600,877 | 6/1952 | Jeffree | 299/84 |
| 3,095,121 | 6/1963 | Douty et al. | 222/52 |
| 3,475,316 | 10/1969 | DeVittorio | 204/299 |
| 3,267,964 | 8/1966 | Steinmetz | 137/624.13 |
| 3,001,889 | 9/1961 | Robinson | 117/51 |
| 759,374 | 5/1904 | Isaacs et al. | 137/604 |
| 2,965,119 | 12/1960 | Hawkinson et al. | 137/115 |
| 3,348,737 | 10/1967 | Yingst et al. | 222/58 |
| 3,056,500 | 10/1962 | Carter | 210/130 |

Primary Examiner—Mervin Stein
Assistant Examiner—Leo Millstein
Attorney—Hofgren, Wegner, Allen, Stellman and McCord

[57] ABSTRACT

A device is provided for lining pipes and the like with calcite. The device includes a reaction and mixing chamber in a U-shaped tube through which a supersaturated solution of calcium carbonate is circulated and delivered through the pipe to be lined. The solution is recycled from the pipe through the reaction chamber where calcium chloride and sodium carbonate are added to maintain the supersaturated conditions. Portions of municipal water main systems can be closed off, lined quickly and put back in service.

8 Claims, 3 Drawing Figures

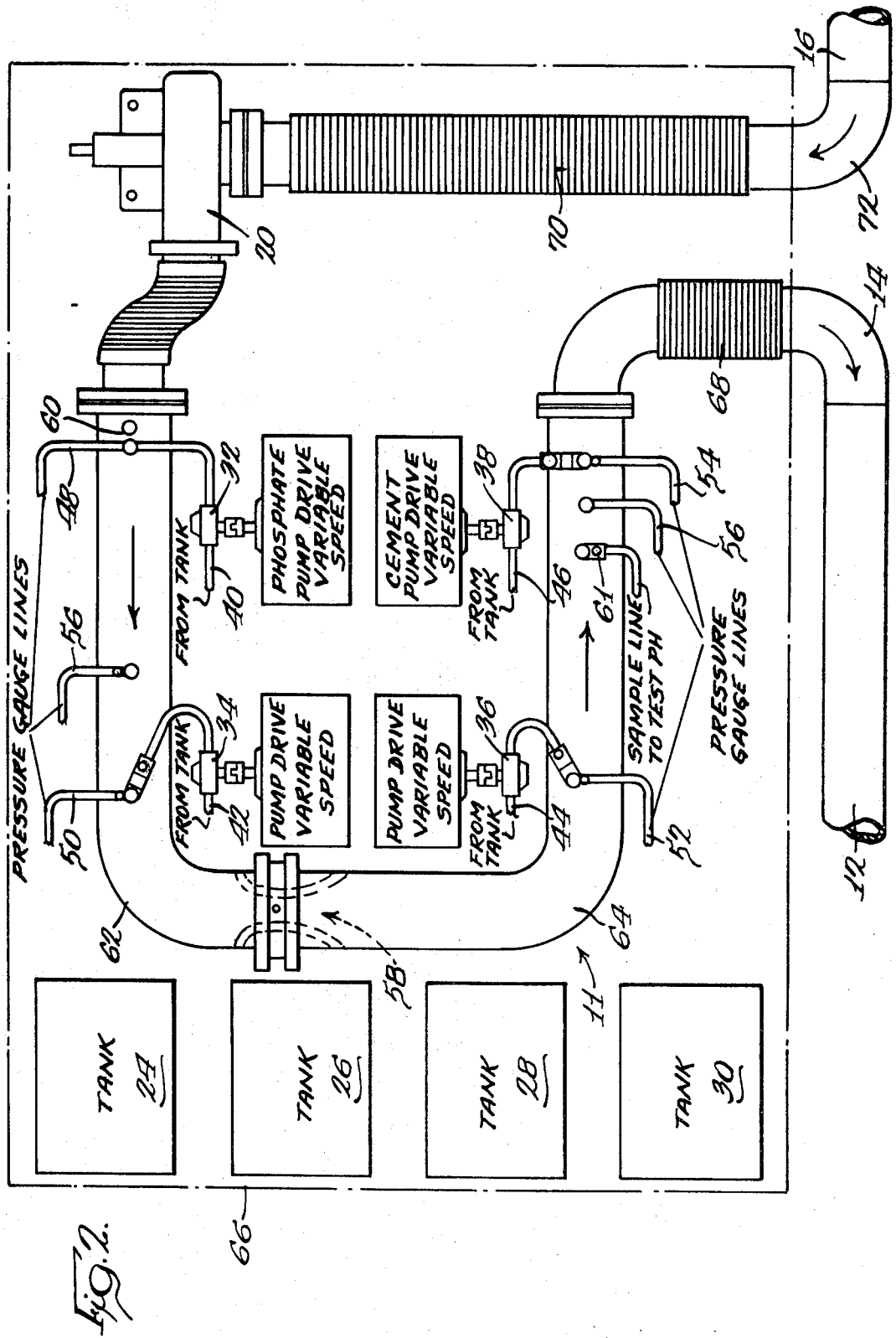

DEVICE FOR LINING PIPES WITH CALCITE

This is a division of application Ser. No. 820,101, filed April 29, 1969.

BACKGROUND OF THE INVENTION

1. Field of the Invention

This invention relates to the protection of water supply pipes or mains against internal corrosion and tuberculation The invention provides a method of protecting pipes.

2. Brief Description of the Prior Art

Tubercles in field water mains impede flow, reduce pressure and result in consumer complaints of discolored water and objectionable taste and odor. The water supply lines can be mechanically cleaned to remove tubercles and such cleaning provides a restored line until retuberculation reduces the margin of flow or pressure to a point when cleaning is necessary once again. Various coatings have been proposed for use in the practical art including bituminous compositions, cement linings and calcite linings. Of these, cement linings have been, to some degree, effective but expensive and time consuming in their installation, especially in small diameter water mains.

It has been proposed to form linings in situ within a main by precipitating calcium carbonate from a solution of calcium compounds within the pipe. Usually, these attempts have been unsuccessful, creating linings which are porous, rough and practically nonprotective.

As an example of coating with calcium carbonate, reference is made to U.S. Pat. No. 2,299,748 issued to George B. Hatch on Oct. 27, 1942. According to the Hatch disclosure an orthophosphate, e.g., sodium orthophosphate, is added to hard water having a zero or negative coefficient according to the Langelier Index in order to cause a protective film of calcium carbonate to form in a pipe line.

More recently it has been proposed to apply protective calcite to the interior of cleaned iron or steel water mains using a controlled supersaturated solution of calcium carbonate with water passing through the main during the coating period. Supersaturated solutions tend to reduce their degree of supersaturation by precipitating the calcium carbonate from solution, but this tendency of the calcium carbonate to precipitate is controlled so as to provide a uniform, adherent, smooth coating. Such a lining process utilizes the calcium carbonate "momentary excess" figure of John F. Dye, Correlation of the Two Principal Methods of Calculating the Three Kinds of Alkalinity, *Jour. AWWA*, 50:800 (June, 1958) and/or the "driving force index" of R. F. McCauley, Use of Polyphosphates for Developing Protective Calcite Coatings, *Journ. AWWA*. 52:721 (June, 1960) and R. F. McCauley and M. O. Abdullah, Carbonate Deposit to Pipe Protection, *Journ. AWWA*, 50:1419 (Nov. 1958). Briefly, the momentary excess of calcium carbonate is that amount of calcium carbonate concentrated in an aqueous solution that exceeds the theoretical maximum concentration as measured by the solubility product constant. The driving force index was devised to express the driving force tending to cause calcium carbonate deposition if the levels of the calcium and of carbonate alkalanity are markedly limited.

Radziul et al, *Jour. AWWA*. November, 1967, page 1413, report results of recent test program involving work with Philadelpha Water Department in laying down calcite linings in 6 inch and 8 inch cast iron pipe. The calcite or eggshell linings were deposited by calcium carbonate precipitation and a cement composition was included with the lining material to plug or otherwise eliminate pores in the normally porous calcite. The inclusion of cement was found to increase the rate of calcium drop. A cost study of the program showed that pipe could be lined at an average cost of less than $2.00 per foot, much less than the cost of conventional cement linings. Considering the cost benefit and the theoretical feasibility of this method, it is surprising that it has not become widely accepted by the trade. However, many problems have remained unsolved and the ability to consistently form non-porous and durable linings has not been proven. Calcite linings laid down in the recent past have generally initially relieved red water conditions, but rust tubercles have still appeared about 5 or 6 months later and at times large portions of lining have disappeared. The Radziul article is incorporated herein by reference because it should be referred to for background before using the present invention.

SUMMARY OF THE INVENTION

The present invention provides a portable device for lining water mains and the like with calcite and a method of using the device. The device includes an open ended tubular member which provides a reaction chamber for a soluble calcium compound, such as calcium chloride, and a soluble carbonate, such as sodium carbonate, to produce calcite. Means are provided for flowing water through the tubular member and for connecting the outlet end of the tubular member to a water main for delivering a supersaturated solution of calcite through the water main. Separate systems are provided for introducing calcium chloride and sodium carbonate into the tubular member or reaction chamber at the controlled rates and the reaction chamber includes means for turbulently mixing the liquid therein to form the calcite as a supersaturated solution. In a preferred form, the reaction chamber is U-shaped with corners sufficiently sharp to cause the turbulent mixing.

In order to line a water main with calcite, the device is attached to the main and water is delivered through the device to the main. Proper amounts of calcium carbonate formers and phosphate are added to the reaction chamber. The solution in the water main can be recycled through the reaction chamber for receiving makeup chemicals until the main has been completely lined. This can be determined from such parameters as optimized pH alkalinity, calcium level and the flow in feet per second. The above parameters, except alkalinity, can be monitored automatically for the purpose of maintaining optimum conditions. After lining the pipe the pH of the water supply flowing through the lines is preferably maintained to reflect a positive Langelier's Index number for several months, then reduced to a level that reflects calcium carbonate equilibrium.

The device can conveniently be used to line private and municipal water main systems. Accordingly, a portion of the water distribution system can be closed off from the remainder of the grids and the process can be used to coat that isolated section. Thereafter, the coated portion can be placed in service and another section isolated for coating.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

BRIEF DESCRIPTION OF THE DRAWINGS

FIG. 2 illustrates the device in more detail; and

BRIEF DESCRIPTION OF THE PREFERRED EMBODIMENTS

Figure 1:
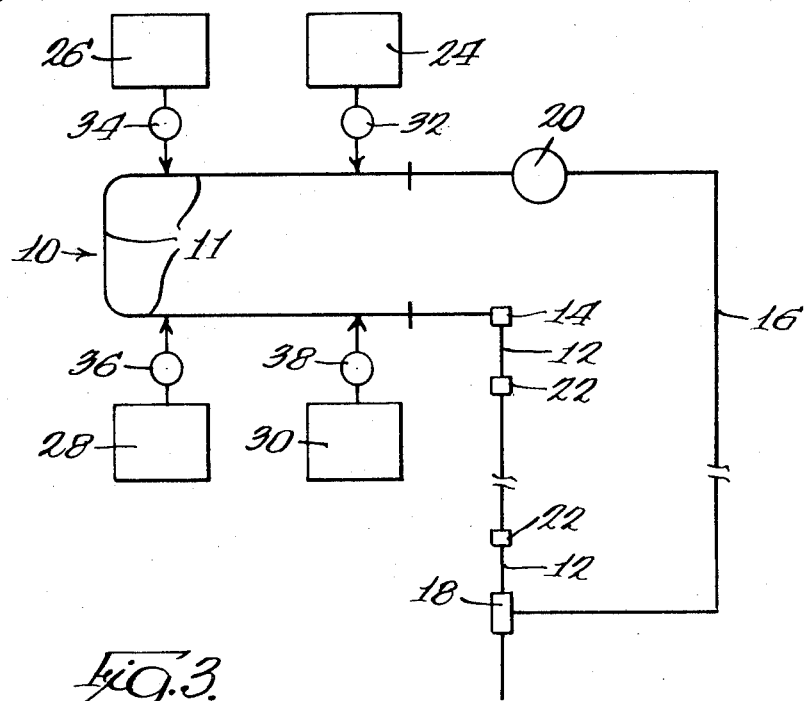
FIG. 1 is a flow diagram of a method of use of an embodiment of the device for this invention.

According to this invention, an iron, steel or other metal conduit is provided with a lining of calcite deposited on the interior of the conduit. The deposit is in the form of a continuous, normally porous, calcite lining of crystalline structure, having its pores plugged with cement deposits. The lined conduit is usually an installed or in-use water supply main which has been cleaned for removal of tubercles or the like. However, the invention is also applicable to new or uninstalled pipe and the lining can be formed on the interior surface prior to use or installation.

The method of lining the conduit or pipe encompasses contacting the interior of the pipe with a supersaturated solution of calcium carbonate, in conjunction with pore-plugging cement, for a time sufficient to form a continuous lining in the pipe. Usually the pipe is an in-use cast iron or steel pipe, and the contacting steps are carried out by flowing a stream of water through the pipe and introducing calcium carbonate into the stream at a concentration, preferably 350 to 800 ppm, and for the required time to form a supersaturated solution of calcium carbonate which deposits to provide the desired lining thickness. Once the desired lining is formed, the introduction of calcium carbonate is discontinued. In a preferred form of the invention, calcite is formed in situ as nascent calcium carbonate from separately introduced streams of calcium halide, e.g., calcium chloride, and alkali metal carbonate, e.g., sodium carbonate, with the stream of alkali metal carbonate being introduced downstream from the stream of calcium halide. Cement is usually introduced downstream from the calcium carbonate precursors.

Ambient conditions can be used in carrying out the method except where the water temperature of the chemical addition solutions or water supply used in making the supersaturated solution is low enough to crystallize out the chemicals in the concentration used. For example, sodium carbonate may crystallize from solution at low ambient temperatures. In such cases the solution can be warmed by heating to prevent such crystallization.

The supersaturated coating solution contains, in addition to calcium carbonate, a soluble phosphate such as sodium hexametraphosphate in an amount between 0.1 and 5 ppm and usually 0.5 to 1 ppm. The phosphate apparently deposits out with the calcium carbonate when the calcite lining is laid down, forming some calcium phosphate in the lining. The crystals of the calcite lining, under microscopic examination, are not always rhombic but include odd shaped crystals, probably crystals of a calcium phosphate complex. The phosphate, being a sequestering agent, helps control the rate of calcium carbonate deposit by holding some of the calcium carbonate in solution. However, since only a small amount of phosphate is used, the sequestering effect does not prevent formation of the calcite lining. The coating solution preferably also contains cement usually from about 20 to about 80 mg/liter.

In the preferred method, the coating method is carried out by delivering the solution at a high displacement velocity of at least 5 and preferably at about 6 feet per second while the solution is maintained in supersaturated condition. This flow rate can also be used for both large mains and small diameter lines. The pH of the solution is maintained at the optimum level to maintain a colloidal calcium carbonate suspension and provide precipitation of the lining at a controlled rate.

Prior to depositing a calcite lining in a section of a main, it is necessary that the section be thoroughly cleaned to the metal to permit a good bond between the coating and the metal surface. The supersaturated coating solution is then introduced into and circulated throughout the section to deposit the calcite lining. As a guide for providing the proper chemical ingredients to make up a proper coating solution, a pH and alkalinity curve is prepared for the water which is to be used as the coating composition carrier. It is normal and preferred to use local water for the carrier, i.e., the same water which will later be conveyed through the coated main. In some instances, e.g. where the local water has a very high iron content, it may be necessary to provide another source of water because iron deposits within the coating would create rust sites which could eventually damage the coating.

The lining method can be used as a part of an overall method for renovating in-use tuberculated pipes. Such an overall method includes the steps of cleaning the interior of the pipe, e.g., by cutting tubercles therefrom, with a reamer. If the pipe is not thoroughly clean, it can be wire-brushed and wet wiped, i.e., squeegeed, to further clean the pipe and remove any detritus. The cleaned pipe is usually then treated with a bactericide, such as potassium permanganate.

The preferred order of addition of ingredients in order to form the solution is as follows: First, preferably at least about 0.5 ppm hexametaphosphate is added. Next the calcium carbonate or calcite formers are added, i.e., the calcium chloride and sodium carbonate. These are added in an amount to produce a calcium level of at least about 250 mg/liter to provide an adequate amount of calcium carbonate. Caustic soda can be used to supplement the sodium carbonate where above normal pH levels are present. During use of the solution, the calcium reduction in the solution will usually be at least 10 and more likely at least about 30 mg/liter/ 1,000 feet. Finally, the cement is added as a means of bridging or plugging the openings between the crystalline lattice of calcium carbonate. The preferred cement is a Medusa and/or Portland type. Addition of the cement usually increases the pH level of the solution thereby having a tendency to increase the calcium reduction per 1,000 feet. The best coatings have been produced using a driving force index (DFI) of 150 to 200 and a momentary excess (ME) of calcium carbonate of about 20 to 60 mg/liter/1,000 feet, based on the absence of cement. When mains are properly lined in accordance with this invention it has been found that coating thicknesses of one-sixteenth inch to one-eighth inch are usually adequate. One way to assure formation of the proper coating of adequate thickness is to measure the pH at the inlet and outlet of the main and when the two pH's become equivalent the coating is complete. From this point on the coating merely gets thicker.

During coating the pH of the coating solution is usually maintained somewhere in the range of 9.0 to 11.0. The pH is sufficiently high to obtain a proper calcium drop or reduction and prevent iron deposits, but it is not so high as to produce a gelantinous solution which will give a porous lining which is easily rubbed off. Most often the pH will be in the range of about 10.4 to 10.8, especially where cement is not used in the coating solution.

A convenient way of determining the optimum conditions of a particular coating operation is by means of a laboratory size piece of equipment which can be a scaled down version of the device of FIG. 2. The laboratory equipment is used to coat various short sections of small diameter tubing or pipe while varying concentrations of the various ingredients within the parameters outlined above until the proper desired coating is obtained. These conditions can then be used during coating operations for all water mains served from the same source or supply of water.

Turning to FIG. 1, the system illustrated includes a mixing and metering device 10 for lining a water main 12 with calcite or "eggshell". A temporary fitting 14 connects water main 12 to the outlet of device 10 and a temporary fitting 18 connects the other end of the portion of main 12 to be lined to a return line 16 for returning or recycling solution to device 10. A pump 20 circulates liquid through device 10, main 12 and return line 16. Removable test coupons 22 can be installed in main 12 and can be removed after main 12 is lined to examine the lining.

Device 10 includes four liquid supply tanks 24, 26, 28 and 30 containing phosphate, calcium chloride, sodium carbonate and cement respectively. Referring to FIG. 2, variable speed metering pumps 32, 34, 36, and 38 deliver liquids from tanks 24, 26, 28 and 30 via lines 40, 42, 44 and 46 to spaced positions along the U shaped tube or pipe 11. Pressure gauge lines 48, 50, 52 and 54 are provided at the delivery positions to assure liquid flow into pipe 11. Additional pressure gauges 56 are provided at spaced positions along pipe 11 to monitor liquid flow through pipe 11. Additionally, a Venturi system 58 is provided for measuring flow rate through pipe 11. Calcium probes 60 and 61 are provided near the inlet and outlet respectively of pipe 11 for determining the fitness of calcium buildup in pipe 11 and therefore in water main 12. Calcium probe 61 is also provided with a sample bleed-off line for withdrawing samples from pipe 11 for test purposes.

With the assembly as shown in FIGS. 1 and 2, pump 20 recirculates liquid through pipe 11, main 12, and return line 16 while pumps 32, 34, 36 and 38 meter the appropriate chemicals in the appropriate amounts into pipe 11 for laying down a coating in main 12. Corners or bends 62 and 64 of the U-shaped pipe 11 create turbulence and mixing of the chemicals within pipe 11 so that thorough mixing is achieved before entry of the liquid into water main 12. The liquid can then proceed through water main 12 for laying down of an even coat on the main interior.

With special reference to FIG. 2, the device illustrated is mounted on a truck 66 so that it may be transported from site to site. At a coating site the device 10 is assembled with return line 16 via temporary fitting 72 and hose connection 70 and is connected to the water main to be coated via hose connector 68 and temporary fitting 14. Once the water main has been properly coated the device is disconnected and can be moved to another area to coat another water main.

When coating large diameter mains with calcite materials, the disposal of the large amount of effluent has been a problem. The present method and device can eliminate this problem by means of the recycle feature.

Figure 3:
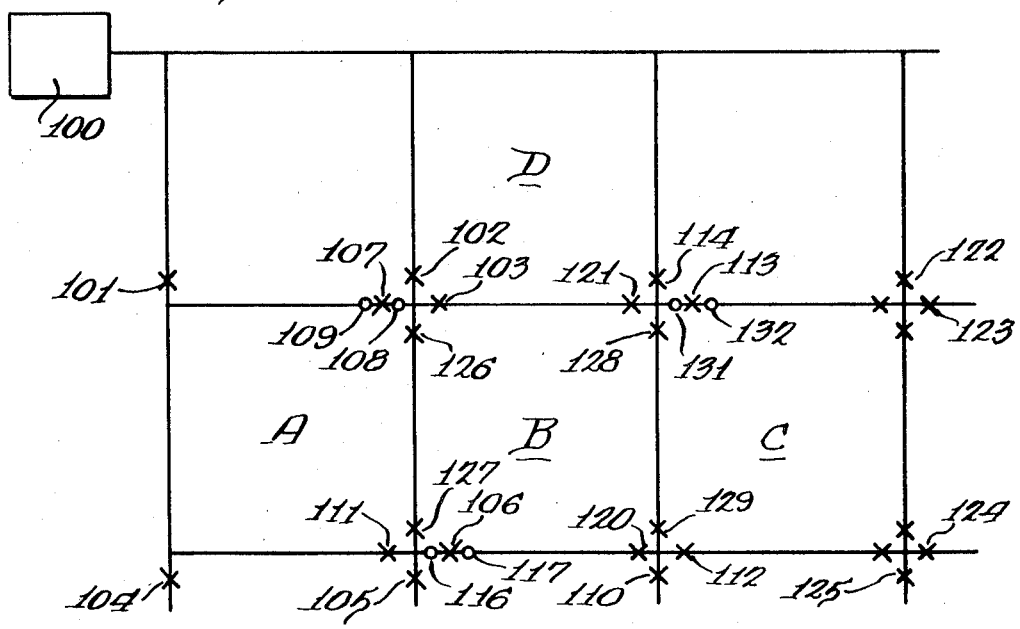
FIG. 3 is a schematic diagram of a municipal water main system which can be calcite coated with the device.

FIG. 3 is a schematic diagram of a water main system for distributing water from a source indicated at 100 through various blocks of a city. The water main system is provided with suitable valves 101 through 107, 110 through 114 and 120 through 129. There is usually one such valve near the end of each block in city water main systems. The system is illustrated as also including a plurality of fittings 108, 109, 116, 117, 131 and 132, two for each block. These fittings can be either permanently installed fittings or can be temporary fittings which are installed by removal of the valve illustrated between fitting pairs.

As an example of lining a block of a city water main system, block A of FIG. 3 is to be lined. For this purpose valves 101 through 106 are closed and fittings 108 and 109 are used. If valve 107 has not been removed during installation of fittings 108 and 109, valve 107 is closed. After cleaning the water main the truck carrying the device of FIG. 2 is moved to location and hose 70 is connected to fitting 108 while hose 68 is connected to fitting 109. Pump 20 is started and metering pumps 32, 34, 36 and 38 are started and the water in the main block A is circulated through the device of FIG. 2 until the proper degree of supersaturation is achieved. The water content is then controlled at the proper composition while circulation of the chemical solution through the water main is continued until the desired thickness of calcite lining is laid down. This usually requires 2 to 4 hours. During circulation of the chemical solution through the water main there is no need to mask over house inlets because the calcite coating does not bridge or close over these inlets. Further, the calcite coating also lines any open valves within the length of pipe coated. After the lining has been laid down, hose 68 is then disconnected from fitting 109 and fresh water is supplied from a nearby main to fitting 109 while pump 20 pumps the chemical solution out of the main with the solution discharging from hose 68 into the street or nearby sewer. The water main can be put back to use immediately. The pH of the water from source 100 has been adjusted to the proper alkaline pH.

With the device 10 disconnected from the water main of block A, it can be moved to an adjacent block, e.g., block C. At block C, the process is repeated by closing valves 110, 114 and 120 through 125 and using fittings 131 and 132. Valve 113 is also closed if it not removed during installation of the fittings. Block B could then be done by closing valve 102, 105, 107 and 110 through 114 and using fittings 116 and 117. Again, if valve 106 has not been removed, it is also closed. It should be noted, however, that lining block B after having lined blocks A and C will result in a double lining of the mains common to block B on the one hand, and blocks A and C on the other hand. A better procedure would be to omit lining block B and go directly to block D which will result in lining one of the unlined mains of block B. The other unlined main of block B can be done later when the block below block B in FIG. 3 is lined. A second coating is not objectionable except for duplication of effort as the extra expense involved is minimal due to the low cost of the process.

Properties of the supplied water to be used in coating the mains are checked to determine the extent to which they may affect the content of the various components of the supersaturated solution. For example, if the water has a high calcium content or a high carbonate content the pH level used in applying the coating is adjusted as is the level of the calcium chloride. The pH of the water supply should be adjusted to a level assuring calcium carbonate stability.

The chemicals to be added to provide the supersaturated solution are prepared solutions held in separate tanks. For example, a satisfactory calcium solution may contain 20 per cent calcium chloride, while the soluble phosphate solution may contain 0.5 per cent sodium hexametaphosphate. The cement slurry may be a solution of 2 per cent by weight. As an example of use of these specific solutions during operation under preferred calcium drop conditions of 10 to 30 mg/1/1,000 feet, at a flow rate of 6 feet per second, a solution flowing through the main can be provided containing 300 – 600 ppm calcium carbonate and about 30 ppm cement. The concentration of sodium hexametaphoshate to be used in the water is 0.5 ppm. Thus pumps 32, 34 and 36 are set initially to deliver the proper amounts of phosphate solution, calcium chloride solution and sodium carbonate solution to provide the desired quantities into the water being pumped into the main. Further, it is desired to provide cement into the water at a required rate so pump 38 is regulated to the proper delivery rate.

Where the solution is not recycled via line 16, but is to be pumped from an open end of line 12, the rate of addition of the various chemcials is maintained fairly constant although the water from the water supply coming through pump 20 should be monitored for any change in its composition so that appropriate adjustment can be made.

Where the recycle line 16 is used, and there is in essence a captive recycle supply of water, change in content of the water supply does not create a real problem. In such cases the calcium content is monitored by calcium probes 60 and 61 and as the water recycles, the pumps are adjusted to then only provide makeup chemicals for maintaining the proper calcium carbonate and cement levels. The phosphate level can be monitored by samples taken from sample line at probe 61 and the phosphate pump 32 is accordingly adjusted. Monitoring and adjusting is usually continuous.

Hazen-Williams coefficients (a measurement of friction loss) of over 100, probably over 115 to 120, may be expected using this process.

All percentages given herein are by weight unless otherwise indicated.

We claim:

1. A portable device for lining water mains with calcite comprising a mobile support structure; means including a tube for defining a reaction chamber mounted on said structure and having open ends; means for connecting at least one of the open ends to a water main; means for circulating liquid through said tube means for delivering liquid to the water main; plural tank means for separately containing soluble calcium solution and soluble carbonate solution; pump means for delivering calcium and carbonate solution from said tank means as separate streams, at controlled rates and for introducing the calcium and carbonate solutions into said tube at spaced points along the length thereof; including means for turbulently mixing the calcium solution and carbonate solution to form calcium carbonate in said reaction chamber for delivery through said main.

2. The device of claim 1, including separate tank means mounted on said support structure for separately containing cement slurry and phosphate solution and means for delivering cement slurry and phosphate solution from said tank means to said tube means at controlled rates.

3. The device of claim 2 wherein said controlled rate delivery means delivers phosphate at the entry end of said tube means and cement at the exit end of said tube means and delivers first calcium solution and then carbonate solution therebetween.

4. The device of claim 1 wherein said tube means is a U-shaped tube having bends sharp enough to provide said mixing means for mixing liquid flowing therethrough.

5. The device of claim 1 including means for recycling liquid from the water main to said circulating means for recirculation through said tube means.

6. The device of claim 5 including a flow meter for determining the rate of flow through said tube and reaction chamber.

7. The device of claim 5 including calcium probes for measuring clacium concentration and for pH monitoring at the inlet and outlet of said tube means.

8. The device of claim 1 including length of water main having opposite open ends connected respectively to the inlet and outlet of said tube means for continuously recycling liquid through said water main, and including a calcite lining depositing from said liquid on the water main interior.

* * * * *